(12) United States Patent
Schaffer et al.

(10) Patent No.: US 9,238,762 B2
(45) Date of Patent: Jan. 19, 2016

(54) OPTICAL ADHESIVE WITH DIFFUSIVE PROPERTIES

(75) Inventors: Kevin R. Schaffer, Woodbury, MN (US); Audrey A. Sherman, St. Paul, MN (US); Ryan E. Marx, Rosemount, MN (US); James M. Nelson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 978 days.

(21) Appl. No.: 12/741,707

(22) PCT Filed: Oct. 31, 2008

(86) PCT No.: PCT/US2008/081957
§ 371 (c)(1),
(2), (4) Date: Aug. 9, 2010

(87) PCT Pub. No.: WO2009/061673
PCT Pub. Date: May 14, 2009

(65) Prior Publication Data
US 2010/0297406 A1    Nov. 25, 2010

Related U.S. Application Data

(60) Provisional application No. 60/986,298, filed on Nov. 8, 2007.

(51) Int. Cl.

| | |
|---|---|
| *C09J 11/08* | (2006.01) |
| *C08F 293/00* | (2006.01) |
| *C08F 297/02* | (2006.01) |
| *C08L 53/00* | (2006.01) |
| *C09J 7/02* | (2006.01) |
| *C09J 9/00* | (2006.01) |
| *C09J 133/06* | (2006.01) |
| *C09J 133/08* | (2006.01) |
| *C09J 135/06* | (2006.01) |
| *C09J 153/00* | (2006.01) |
| *G02B 5/02* | (2006.01) |
| *G02F 1/1335* | (2006.01) |

(52) U.S. Cl.
CPC ............ *C09J 11/08* (2013.01); *C08F 293/005* (2013.01); *C08F 297/026* (2013.01); *C08L 53/00* (2013.01); *C09J 7/0217* (2013.01); *C09J 7/0221* (2013.01); *C09J 9/00* (2013.01); *C09J 133/06* (2013.01); *C09J 133/08* (2013.01); *C09J 135/06* (2013.01); *C09J 153/00* (2013.01); *G02B 5/0242* (2013.01); *G02B 5/0294* (2013.01); *G02F 1/133606* (2013.01); *C09J 2201/606* (2013.01); *C09J 2433/00* (2013.01); *C09J 2453/00* (2013.01); *G02F 2202/28* (2013.01); *Y10T 428/24802* (2015.01); *Y10T 428/31855* (2015.04)

(58) Field of Classification Search
None
See application file for complete search history.

(56) References Cited

U.S. PATENT DOCUMENTS

| | | |
|---|---|---|
| 4,619,979 A | 10/1986 | Kotnour |
| 4,833,134 A | 5/1989 | Kishimoto |
| 4,843,134 A | 6/1989 | Kotnour |
| 4,848,353 A * | 7/1989 | Engel ............................ 600/391 |
| 4,963,624 A * | 10/1990 | Ida et al. ....................... 525/309 |
| 5,223,465 A | 6/1993 | Ueki |
| RE34,605 E | 5/1994 | Schrenk |
| 5,360,659 A | 11/1994 | Arends |
| 5,468,803 A | 11/1995 | Takahashi |
| 5,579,162 A | 11/1996 | Bjornard |
| 5,637,646 A | 6/1997 | Ellis |
| 5,846,559 A * | 12/1998 | Hopp ............................ 424/448 |
| 5,882,774 A | 3/1999 | Jonza |
| 6,049,419 A | 4/2000 | Wheatley |
| 6,288,172 B1 | 9/2001 | Goetz et al. |
| 6,348,960 B1 | 2/2002 | Etori et al. |
| 6,448,353 B1 | 9/2002 | Nelson et al. |
| 6,503,621 B1 | 1/2003 | Ma |
| 6,630,239 B2 | 10/2003 | Cernohous et al. |
| 6,652,963 B2 * | 11/2003 | Husemann et al. ..... 428/355 AC |
| 6,720,387 B1 | 4/2004 | Stark et al. |
| 6,881,473 B2 * | 4/2005 | Takahashi et al. ............. 428/212 |
| 6,984,427 B2 * | 1/2006 | Galkiewicz et al. .......... 428/40.1 |
| 8,129,470 B2 * | 3/2012 | Dollase et al. ................... 525/89 |
| 2004/0202879 A1 | 10/2004 | Xia et al. |
| 2004/0223224 A1 | 11/2004 | Murata et al. |
| 2006/0024521 A1 | 2/2006 | Everaerts et al. |
| 2006/0235150 A1 * | 10/2006 | Dollase et al. ................... 525/89 |
| 2006/0291055 A1 * | 12/2006 | Gehlsen et al. ................ 359/486 |
| 2007/0009582 A1 * | 1/2007 | Madsen et al. ................. 424/445 |
| 2007/0116920 A1 * | 5/2007 | Krishnan et al. ............. 428/64.4 |
| 2009/0136774 A1 * | 5/2009 | Onogi et al. ................... 428/516 |

FOREIGN PATENT DOCUMENTS

| | | |
|---|---|---|
| EP | 0352901 | 6/1989 |
| EP | 0437068 | 7/1991 |
| JP | 07-13347 | 5/1995 |
| JP | 11-001670 | 1/1999 |

(Continued)

*Primary Examiner* — Scott R Walshon
(74) *Attorney, Agent, or Firm* — Jeffrey M. Olofson

(57) ABSTRACT

Optical adhesives that also diffuse visible light include a blend of an adhesive matrix which is an optical adhesive and a block copolymer. The adhesive may be a pressure sensitive adhesive and contains either acid or basic functionality. The block copolymer, which may be a diblock copolymer, contains a high Tg block and a functional block, the functionality of the functional block is complimentary to the functionality of the adhesive matrix to form an acid-base interaction. The adhesive may also contain a crosslinking agent.

11 Claims, No Drawings

(56) References Cited

FOREIGN PATENT DOCUMENTS

| | | |
|---|---|---|
| JP | 11-116644 | 4/1999 |
| JP | 2000-290339 | 10/2000 |
| JP | 2000290339 A * | 10/2000 |
| JP | 2004-002532 | 1/2004 |
| JP | 2004-083645 | 3/2004 |
| JP | 2004-083646 | 3/2004 |
| JP | 2004-083647 | 3/2004 |
| WO | WO 96/25469 | 8/1996 |
| WO | WO 97/01610 | 1/1997 |
| WO | WO 97/22675 | 6/1997 |
| WO | WO 97/33945 | 9/1997 |
| WO | WO 99/56158 | 11/1999 |
| WO | WO 2005033198 A1 * | 4/2005 |
| WO | WO 2007114134 A1 * | 10/2007 |

* cited by examiner

OPTICAL ADHESIVE WITH DIFFUSIVE PROPERTIES

CROSS REFERENCE TO RELATED APPLICATIONS

This application is a national stage filing under 35 U.S.C. 371 of PCT/US2008/081957, filed Oct. 31, 2008, which claims priority to U.S. Provisional Application No. 60/986,298, filed Nov. 8, 2007, the disclosure of which is incorporated by reference in its/their entirety herein.

FIELD OF THE DISCLOSURE

The present disclosure relates to adhesives that have optical diffusive properties.

BACKGROUND

Information displays, such as liquid crystal displays and rear projection screens, often rely on light-diffusing optical constructions for efficient operation and enhanced readability. Such light-diffusing constructions assume critical roles in these displays by forward scattering the light from a source without a significant loss in the intensity of the forward scattered light. This scattered, yet high transmittance, resultant light gives such displays a desirable background brightness by reducing the amount of incident light which is scattered or reflected back toward the light source. Elimination or restriction of such "backscattered" light is a key factor in designing these light-diffusing constructions. Diffusers can be incorporated into optical systems by adding an additional diffuser component to the system, or, in some cases, by incorporating diffusive properties into an existing component.

Adding additional components to an optical system has the disadvantage of introducing additional absorption and creating additional interfaces that can reflect light, thereby causing loss of illumination and other forms of image degradation. Additionally, in some multilayer systems it may be difficult or impossible to add additional components.

Incorporating diffusive properties into an existing optical component may be achieved by, for example, etching or sandblasting a surface of an existing optical component or by filling or embedding the optical component, such as an adhesive layer, with diffusive particles. However, incorporating a diffusing layer into an existing component in the system complicates component design, adds manufacturing steps, and can have an adverse effect on performance and on product yield during manufacturing. In particular, the use of particles can detract from the overall brightness or transmittance of the incident light through backscatter.

SUMMARY

An optical component layer, such as an adhesive layer, that also can be made to diffuse light without the addition of particles or fillers is desirable. The addition of particles and fillers is problematic, not only because of the complications of backscatter, but also because such particles and fillers render the adhesive incapable of being filtered, a process frequently desirable to raise the purity of the adhesive.

Adhesive compositions that are capable of diffusing visible light are provided. In some embodiments these diffusive adhesive compositions comprise an optically clear pressure sensitive adhesive matrix, a block copolymer dispersed within the adhesive matrix, wherein the adhesive comprises phase-separated microdomains that are larger than the wavelength of visible light. The adhesive compositions may further comprise a crosslinker.

Also provided are optical articles comprising an optical film and a diffusive adhesive at least partially coated on the optical film, wherein the diffusive adhesive comprises an optically clear pressure sensitive adhesive matrix and a block copolymer dispersed within the adhesive matrix. The adhesive comprises phase-separated microdomains.

In addition, optical laminates are provided. The optical laminates comprise a substrate, and an optical article laminated to the substrate. The optical articles laminated to the substrate comprise an optical film and a diffusive adhesive at least partially coated on the optical film, wherein the diffusive adhesive comprises an optically clear pressure sensitive adhesive matrix, and a block copolymer dispersed within the adhesive matrix. The adhesive comprises phase-separated microdomains.

DETAILED DESCRIPTION

An optical adhesive that also functions to diffuse visible light is disclosed. The diffusive adhesive composition comprises a block copolymer dispersed within an adhesive matrix. The dispersed block copolymer may be dispersed uniformly or randomly. An acid-base interaction between the adhesive matrix and the block copolymer aids the structural integrity of the adhesive which may also contain a crosslinking agent. The diffusive adhesive comprises phase-separated microdomains that are larger than the wavelength of visible light. The diffusive adhesive is free or substantially free of diffusive particles.

The term "adhesive" as used herein refers to polymeric compositions useful to adhere together two adherends. Examples of adhesives are non-tacky adhesives (i.e., cold-seal adhesives), heat activated adhesives, structural adhesives and pressure sensitive adhesives.

Non-tacky adhesives have limited or low tack to most substrates but can have acceptable adhesive strength when paired with specific target substrates or when two layers of the non-tacky adhesives are contacted. The non-tacky adhesive adheres by affinity.

Heat activated adhesives are non-tacky at room temperature but become tacky and capable of bonding to a substrate at elevated temperatures. These adhesives usually have a Tg or melting point (Tm) above room temperature. When the temperature is elevated above the Tg or Tm, the storage modulus usually decreases and the adhesive become tacky.

Structural adhesives refer to adhesives that that can bond other high strength materials (e.g., wood, composites, or metal) so that the adhesive bond strength is in excess of 6.0 MPa (1000 psi).

Pressure sensitive adhesive (PSA) compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as PSAs are polymers designed and formulated to exhibit the requisite viscoelastic properties resulting in a desired balance of tack, peel adhesion, and shear holding power. Obtaining the proper balance of properties is not a simple process.

As used herein the term "diffusive adhesive" or "diffusive pressure sensitive adhesive" refers to an adhesive or pressure sensitive adhesive that is optically transmissive and also diffuses visible light.

Unless otherwise indicated, "optically clear" refers to an adhesive or article that has a high light transmittance over at least a portion of the visible light spectrum (about 400 to about 700 nm), and that exhibits low haze.

Unless otherwise indicated, "optically transmissive" refers to an adhesive or article that has a high light transmittance over at least a portion of the visible light spectrum (about 400 to about 700 nm).

As used herein, the term "polymer" refers to a polymeric material that is a homopolymer or a copolymer. As used herein, the term "homopolymer" refers to a polymeric material that is the reaction product of one monomer. As used herein, the term "copolymer" refers to a polymeric material that is the reaction product of at least two different monomers. As used herein, the term "block copolymer" refers to a copolymer formed by covalently bonding at least two different polymeric blocks to each other. The two different polymeric blocks are referred to as the A block and the B block. Typically, the A blocks provide discrete reinforcing "microdomains" within an overwhelming continuous phase formed from less rigid B blocks by phase separation between the A and B blocks to cohesively reinforce the elastomer. The term "phase separation" as used herein refers to the presence of distinct reinforcing A block domains (i.e., microdomains) in a matrix comprised of the softer B block and adhesive matrix phases. In order to function as a diffuser, the phase separated microdomains should be larger than the wavelength of visible light (about 400 to about 700 nm).

The terms "Tg" and "glass transition temperature" are used interchangeably and refer to the temperature at which a reversible change occurs in an amorphous polymer when it is heated to a certain temperature and it undergoes a rather sudden transition from a hard, glassy, or brittle condition to a flexible or elastomeric condition. Unless otherwise noted Tg values refer to the values measured by Differential Scanning Calorimetry (DSC).

The "acid-base interaction" that is present between the polymers described herein may be described as a Lewis acid-base type interaction. Lewis acid-base interactions require that one chemical component be an electron acceptor (acid) and the other an electron donor (base). The electron donor provides an unshared pair of electrons and the electron acceptor furnishes an orbital system that can accommodate the additional unshared pair of electrons.

Typical embodiments of the diffusive adhesive of this disclosure comprise an adhesive matrix, a block copolymer dispersed in the adhesive matrix and a crosslinker. An acid-base interaction between the adhesive matrix and the block copolymer aids the structural integrity of the diffusive adhesive composition.

The adhesive matrix in the diffusive adhesive composition generally is an optically clear adhesive. In some embodiments, the optically clear adhesive has a % Transmission of 95% or greater, or even 99% or greater. Also, in some embodiments the optically clear adhesive has a haze value of 3% or less, or even 1% or less. In some embodiments the optically clear adhesive has a clarity value of 99% or greater. In some embodiments, the adhesive is an optically clear pressure sensitive adhesive. The pressure sensitive adhesive component can be a single pressure sensitive adhesive or the pressure sensitive adhesive can be a combination of two or more pressure sensitive adhesives.

Optically clear pressure sensitive adhesives useful in the present disclosure include, for example, those based on natural rubbers, synthetic rubbers, styrene block copolymers, polyvinyl ethers, poly(meth)acrylates (including both acrylates and methacrylates), polyolefins, and silicones.

The optically clear pressure sensitive adhesives are generally acrylate-based pressure sensitive adhesives and comprise either an acidic or basic copolymer. In most embodiments the acrylate-based pressure sensitive adhesive is an acidic copolymer. Generally, as the proportion of acidic monomers used in preparing the acidic copolymer increases, cohesive strength of the resulting adhesive increases. The proportion of acidic monomers is usually adjusted depending on the proportion of acidic copolymer present in the blends of the present disclosure.

To achieve pressure sensitive adhesive characteristics, the corresponding copolymer can be tailored to have a resultant glass transition temperature (Tg) of less than about 0° C. Particularly preferred pressure sensitive adhesive copolymers are (meth)acrylate copolymers. Such copolymers typically are derived from monomers comprising about 40% by weight to about 98% by weight, often at least 70% by weight, or at least 85% by weight, or even about 90% by weight, of at least one alkyl(meth)acrylate monomer that, as a homopolymer, has a Tg of less than about 0° C.

Examples of such alkyl(meth)acrylate monomers are those in which the alkyl groups comprise from about 4 carbon atoms to about 12 carbon atoms and include, but are not limited to, n-butyl acrylate, 2-ethylhexyl acrylate, isooctyl acrylate, isononyl acrylate, isodecyl, acrylate, and mixtures thereof. Optionally, other vinyl monomers and alkyl (meth)acrylate monomers which, as homopolymers, have a Tg greater than 0° C., such as methyl acrylate, methyl methacrylate, isobornyl acrylate, vinyl acetate, styrene, and the like, may be utilized in conjunction with one or more of the low Tg alkyl(meth)acrylate monomers and copolymerizable basic or acidic monomers, provided that the Tg of the resultant (meth) acrylate copolymer is less than about 0° C.

In some embodiments, it is desirable to use (meth)acrylate monomers that are free of alkoxy groups. Alkoxy groups are understood by those skilled in the art.

When used, basic (meth)acrylate copolymers useful as the pressure sensitive adhesive matrix typically are derived from basic monomers comprising about 2% by weight to about 50% by weight, or about 5% by weight to about 30% by weight, of a copolymerizable basic monomer.

When used to form the pressure sensitive adhesive matrix, acidic (meth)acrylate copolymers typically are derived from acidic monomers comprising about 2% by weight to about 30% by weight, or about 2% by weight to about 15% by weight, of a copolymerizable acidic monomer.

In certain embodiments, the poly(meth)acrylic pressure sensitive adhesive matrix is derived from between about 1 and about 20 weight percent of acrylic acid and between about 99 and about 80 weight percent of at least one of isooctyl acrylate, 2-ethyl-hexyl acrylate or n-butyl acrylate composition. In some embodiments, the pressure sensitive adhesive matrix is derived from between about 2 and about 10 weight percent acrylic acid and between about 90 and about 98 weight percent of at least one of isooctyl acrylate, 2-ethyl-hexyl acrylate or n-butyl acrylate composition.

The pressure sensitive adhesive may be inherently tacky. If desired, tackifiers may be added to a base material to form the pressure sensitive adhesive. Useful tackifiers include, for example, rosin ester resins, aromatic hydrocarbon resins, aliphatic hydrocarbon resins, and terpene resins. Other materials can be added for special purposes, including, for example, oils, plasticizers, antioxidants, ultraviolet ("UV") stabilizers, hydrogenated butyl rubber, pigments, curing agents, polymer additives, thickening agents, chain transfer agents and other additives provided that they do not reduce the optical clarity of the pressure sensitive adhesive.

The block copolymer dispersed in the adhesive matrix may be selected from a wide array of block copolymer types. The block copolymer may be, for example, a diblock copolymer, a triblock copolymer, star block copolymer or combination thereof.

In some embodiments the block copolymer is a diblock copolymer of the AB type where A represents a higher Tg block and B represents an elastomeric block containing either acidic or basic functionality. Because the A block has a solubility parameter sufficiently different than the B block, the A block phase and the B block phase are usually separated. Because the block copolymer is dispersed within an adhesive matrix and the B block interacts with the adhesive matrix through an acid-base interaction, the A block can phase separate to form distinct regions (e.g., microdomains) within the continuous domain of the softer, elastomeric B block/adhesive matrix. It is desirable that the microdomains be large enough to forward scatter incident light, but not so large that they backscatter incident light. Typically these microdomains are larger than the wavelength of visible light (about 400 to about 700 nm). In some embodiments the microdomain size is 1.0 to 10 micrometers, 1.0-5.0 micrometers or 1.0-4.0 micrometers or even 1.05-3.0 micrometers.

Generally the A block comprises monomers of relatively high Tg. High Tg monomers are generally those monoethylenically unsaturated monomers which as homopolymers have a glass transition temperature (Tg) greater than about 20° C. In some instances the monomers have a Tg as a homopolymer of greater than 40° C. or greater than 60° C. Typically the A block is independently derived from monoethylenically unsaturated monomers selected from the group consisting of styrenes, or (meth)acrylate esters of non-tertiary alkyl alcohols. Styrene is a particularly preferred monomer.

Generally the B block comprises monomers that are elastomeric and have greater compatibility with the adhesive matrix polymer. Additionally, the B block comprises functionality complementary with the functionality of the adhesive matrix. If the adhesive matrix contains acidic monomers, the B block comprises basic monomers and if the adhesive matrix contains basic monomers, the B block comprises acidic monomers. In some embodiments the adhesive matrix contains carboxylic acid monomers and the B block contains basic monomers.

A wide variety of basic monomers are useful in preparing the block copolymer. In some embodiments, the basic monomer is a nitrogen-containing monomer, such as those of Formula (I):

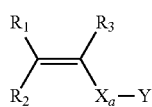

Formula (I)

wherein a is 0 or 1;

$R_1$, $R_2$, and $R_3$ are independently selected from H— and $CH_3$— or other alkyl group, X is selected from an ester or amide group; and Y is an alkyl group, a nitrogen-containing aromatic, nitrogen-containing group, such as the group:

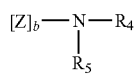

wherein

Z is a divalent linking group (typically about 1 to 5 carbon atoms);

b is 0 or 1; and $R_4$ and $R_5$ are selected from hydrogen, alkyl, aryl, cycloalkyl, and arenyl groups.

$R_4$ and $R_5$ in the above group may also form a heterocycle. In all embodiments, Y, $R^1$, and $R^2$ may also comprise heteroatoms, such as O, S, N, etc. While Formula I summarizes the majority of basic monomers useful in the present invention, other nitrogen-containing monomers are possible if they meet the definition of a basic monomer (i.e., can be titrated with an acid).

Exemplary basic monomers include N,N-dimethylaminopropyl methacrylamide (DMAPMAm); N,N-diethylaminopropyl methacrylamide (DEAPMAm); N,N-dimethylaminoethyl acrylate (DMAEA); N,N-diethylaminoethyl acrylate (DEAEA); N,N-dimethylaminopropyl acrylate (DMAPA); N,N-diethylaminopropyl acrylate (DEAPA); N,N-dimethylaminoethyl methacrylate (DMAEMA); N,N-diethylaminoethyl methacrylate (DEAEMA); N,N-dimethylaminoethyl acrylamide (DMAEAm); N,N-dimethylaminoethyl methacrylamide (DMAEMAm); N,N-diethylaminoethyl acrylamide (DEAEAm); N,N-diethylaminoethyl methacrylamide (DEAEMAm); N,N-dimethylaminoethyl vinyl ether (DMAEVE); N,N-diethylaminoethyl vinyl ether (DEAEVE); and mixtures thereof. Other useful basic monomers include vinylpyridine, vinylimidazole, tertiary amino-functionalized styrene (e.g., 4-(N,N-dimethylamino)-styrene (DMAS), 4-(N,N-diethylamino)-styrene (DEAS)), N-vinyl pyrrolidone, N-vinyl caprolactam, acrylonitrile, N-vinyl formamide, (meth)acrylamide, and mixtures thereof.

Typically the block copolymer has a molecular weight of greater than 10,000 grams/mole. In some embodiments the molecular weight is greater than 12,000 grams/mole or even greater than 15,000 grams/mole. In some embodiments the block copolymer contains an A block which has a molecular weight of greater than 10,000 grams/mole and a B block with a molecular weight of 300 grams/mole or more.

In some embodiments it is desirable for the composition to contain a crosslinking agent. In general the crosslinking agents contain functionality which are reactive with carboxylic acid groups on the acrylic copolymer. Examples of such crosslinkers include multifunctional aziridine, isocyanate and epoxy compounds. Examples of aziridine-type crosslinkers include, for example 1,4-bis(ethyleneiminocarbonylamino)benzene, 4,4'-bis(ethyleneiminocarbonylamino) diphenylmethane, 1,8-bis(ethyleneiminocarbonylamino) octane, and 1,1'-(1,3-phenylene dicarbonyl)-bis-(2-methylaziridine). The aziridine crosslinker 1,1'-(1,3-phenylene dicarbonyl)-bis-(2-methylaziridine) (CAS No. 7652-64-4), referred to herein as "Bisamide" is particularly useful. Common polyfunctional isocyanate crosslinkers include, for example, trimethylolpropane toluene diisocyanate, tolylene diisocyanate, and hexamethylene diisocyanate.

The diffusive pressure sensitive adhesives of this disclosure are optical adhesives that also function to diffuse visible light without a significant amount of backscattered light. The diffusion of light results in an increase in the level of haze of the adhesive without a major decrease in the % transmission or clarity. Typically the diffusive pressure sensitive adhesives have haze values of 20% or greater as measured by the Test Methods listed in the Examples section below. In some embodiments the haze value is 30% or greater. These haze values are obtained for the diffusive pressure sensitive adhesive and yet the adhesive retains % transmission values of 90% or greater and clarity values of 80% or even 90% as measured by the Methods listed in the Examples section below.

The diffusive pressure sensitive adhesives of this disclosure maintain their adhesive properties besides exhibiting desirable optical properties. Typically the diffusive pressure sensitive adhesives have 180° peel strengths of at least 10 Newtons/decimeter when peeled from a glass substrate using the Test Method listed in the Examples section below. In some embodiments the 180° peel strength is at least 20 Newtons/decimeter when peeled from a glass substrate using the Test Method listed in the Examples section below.

In some embodiments, the diffusive pressure sensitive adhesives are environmentally resistant. Environmentally resistant adhesives are those that maintain adhesive bonds when bonded to substrates, especially outgassing substrates (outgassing substrates are described below), and tested under accelerated aging conditions. Among the accelerated aging conditions useful for testing diffusive pressure sensitive adhesives bonded to substrates include, for example, aging for one week at 95° C. and 95% Relative Humidity (RH). Generally, to pass the accelerated aging tests, the adhesive bond does not exhibit delamination or bubbles in the bond line as described in the Test Method listed in the Examples section below.

The adhesive matrix polymer and the block copolymer are typically prepared separately and blended with a crosslinking agent to form the diffusive adhesive composition.

The adhesive matrix copolymers can be prepared by any conventional free radical polymerization method, including solution, radiation, bulk, dispersion, emulsion, and suspension processes. In one solution polymerization method, the monomers, along with a suitable inert organic solvent, are charged into a four-neck reaction vessel that is equipped with a stirrer, a thermometer, a condenser, an addition funnel, and a temperature controller.

A concentrated thermal free radical initiator solution is added to the addition funnel. The whole reaction vessel, addition funnel, and their contents are then purged with nitrogen to create an inert atmosphere. Once purged, the solution within the vessel is heated to an appropriate temperature to activate the free radical initiator to be added, the initiator is added, and the mixture is stirred during the course of the reaction. A 98% to 99% conversion can typically be obtained in about 20 hours.

Bulk polymerization methods, such as the continuous free radical polymerization method described by Kotnour et al. in U.S. Pat. Nos. 4,619,979 and 4,843,134; the essentially adiabatic polymerization methods using a batch reactor described by Ellis in U.S. Pat. No. 5,637,646; suspension polymerization processes described by Young et al. in U.S. Pat. No. 4,833,179; and, the methods described for polymerizing packaged pre-adhesive compositions described by Hamer et al. in PCT Publication No. WO 97/33945 may also be utilized to prepare the polymers.

Suitable thermal free radical initiators which may be utilized include, but are not limited to, those selected from azo compounds, such as 2,2'-azobis(isobutyronitrile); hydroperoxides, such as tert-butyl hydroperoxide; and, peroxides, such as benzoyl peroxide and cyclohexanone peroxide. Photoinitiators which are useful according to the invention include, but are not limited to, those selected from benzoin ethers, such as benzoin methyl ether or benzoin isopropyl ether; substituted benzoin ethers, such as anisole methyl ether; substituted acetophenones, such as 2,2-diethoxyacetophenone and 2,2-dimethoxy-2-phenyl acetophenone; substituted alpha-ketols, such as 2-methyl-2-hydroxy propiophenone; aromatic sulfonyl chlorides, such as 2-naphthalene sulfonyl chloride; and, photoactive oximes, such as 1-phenyl-1,2-propanedione-2-(ethoxycarbonyl)oxime. For both thermal- and radiation-induced polymerizations, the initiator is present in an amount of about 0.05% to about 5.0% by weight based upon the total weight of the monomers.

A variety of different known methods are useful for the synthesis of the block copolymer. They may be prepared in solvent by addition mechanisms, including anionic and/or free radical polymerization processes. Additionally, they may be prepared in a continuous process utilizing a stirred tube reactor such as the process described in U.S. Pat. No. 6,448,353 (Nelson et al).

While solventless embodiments are visualized within the scope of this disclosure it is typically preferred that solvents are used in blending and coating the diffusive adhesive compositions. In particular, solventless coating methods such as hot melt coating have been observed to cause orientation in the adhesive coating and this orientation can cause optical birefringence (see for example PCT Publication Number WO 97/22675). Optical birefringence is the resolution or splitting of a light wave into two unequally reflected or transmitted waves by an optically anisotropic medium. Suitable solvents include ethyl acetate, acetone, methyl ethyl ketone, heptane, toluene, and alcohols such as methanol, ethanol and isopropanol and mixtures thereof. If used, the amount of solvent is generally about 30-80% by weight based on the total weight of the components (polymers, crosslinkers and any additives) and solvent.

The solvent borne diffusive adhesive mixture can be coated by any suitable process, such as by, for example, knife coating, roll coating, gravure coating, rod coating, curtain coating, and air knife coating. The diffusive adhesive mixture may also be printed by known methods such as screen printing or inkjet printing. The diffusive adhesive coating is typically then dried to remove the solvent. In some embodiments the coating is subjected to increased temperatures such as supplied by an oven (e.g. a forced air oven) in order to expedite the drying of the adhesive.

In some embodiments it may be desirable to impart a microstructured surface to one or both major surfaces of the adhesive. It may be desirable to have a microstructured surface on at least one surface of the adhesive to aid air egress during lamination. If it is desired to have a microstructured surface on one or both surfaces of the adhesive layer, the adhesive coating or layer may be placed on a tool or a liner containing microstructuring. The liner or tool can then be removed to expose an adhesive layer having a microstructured surface. Generally with optical applications it is desirable that the microstructure disappear over time to prevent interference with optical properties.

The diffusive adhesive may be used to make optical articles. Such articles may include an optical film, a substrate or both. The diffusive adhesive is particularly useful in applications in which a separate diffuser layer or film is currently used. Such uses include information displays, such as liquid crystal displays and rear projection screens.

Articles are provided that include an optical film and a diffusive pressure sensitive adhesive layer adjacent to at least one major surface of the optical film. The articles can further include another substrate (e.g., permanently or temporarily attached to the pressure sensitive adhesive layer), another adhesive layer, or a combination thereof. As used herein, the term "adjacent" can be used to refer to two layers that are in direct contact or that are separated by one or more layers. Often, adjacent layers are in direct contact.

Additionally, articles are provided that include a pressure sensitive adhesive layer positioned between two substrates, wherein at least one of the substrates is an outgassing substrate. The pressure sensitive adhesive layer is resistant to bubble formation when adjacent to an outgassing substrate.

In some embodiments, the resulting articles can be optical elements or can be used to prepare optical elements. As used herein, the term "optical element" refers to an article that has an optical effect or optical application. The optical elements can be used, for example, in electronic displays, architectural applications, transportation applications, projection applications, photonics applications, and graphics applications. Suitable optical elements include, but are not limited to, screens or displays, cathode ray tubes, polarizers, reflectors, and the like.

Any suitable optical film can be used in the articles. As used herein, the term "optical film" refers to a film that can be used to produce an optical effect. The optical films are typically polymer-containing films that can be a single layer or multiple layers. The optical films are flexible and can be of any suitable thickness. The optical films often are at least partially transmissive, reflective, antireflective, polarizing, optically clear, or diffusive with respect to some wavelengths of the electromagnetic spectrum (e.g., wavelengths in the visible ultraviolet, or infrared regions of the electromagnetic spectrum). Exemplary optical films include, but are not limited to, visible mirror films, color mirror films, solar reflective films, infrared reflective films, ultraviolet reflective films, reflective polarizer films such as a brightness enhancement films and dual brightness enhancement films, absorptive polarizer films, optically clear films, tinted films, and antireflective films.

Some optical films have multiple layers such as multiple layers of polymer-containing materials (e.g., polymers with or without dyes) or multiple layers of metal-containing material and polymeric materials. Some optical films have alternating layers of polymeric material with different indexes of refraction. Other optical films have alternating polymeric layers and metal-containing layers. Exemplary optical films are described in the following patents: U.S. Pat. No. 6,049,419 (Wheatley et al.); U.S. Pat. No. 5,223,465 (Wheatley et al.); U.S. Pat. No. 5,882,774 (Jonza et al.); U.S. Pat. No. 6,049,419 (Wheatley et al.); U.S. Pat. No. RE 34,605 (Schrenk et al.); U.S. Pat. No. 5,579,162 (Bjornard et al.), and U.S. Pat. No. 5,360,659 (Arends et al.).

The substrate included in the article can contain polymeric materials, glass materials, ceramic materials, metal-containing materials (e.g., metals or metal oxides), or a combination thereof. The substrate can include multiple layers of material such as a support layer, a primer layer, a hard coat layer, a decorative design, and the like. The substrate can be permanently or temporarily attached to an adhesive layer. For example, a release liner can be temporarily attached and then removed for attachment of the adhesive layer to another substrate.

The substrate can have a variety of functions such as, for example, providing flexibility, rigidity, strength or support, reflectivity, antireflectivity, polarization, or transmissivity (e.g., selective with respect to different wavelengths). That is, the substrate can be flexible or rigid; reflective or non-reflective; visibly clear, colored but transmissive, or opaque (e.g., not transmissive); and polarizing or non-polarizing.

Exemplary substrates include, but are not limited to, the outer surface of an electronic display such as liquid crystal display or a cathode ray tube, the outer surface of a window or glazing, the outer surface of an optical component such as a reflector, polarizer, diffraction grating, mirror, or lens, another film such as a decorative film or another optical film, or the like.

Representative examples of polymeric substrates include those that contain polycarbonates, polyesters (e.g., polyethylene terephthalates and polyethylene naphthalates), polyurethanes, poly(meth)acrylates (e.g., polymethyl methacrylates), polyvinyl alcohols, polyolefins such as polyethylenes and polypropylenes, polyvinyl chlorides, polyimides, cellulose triacetates, acrylonitrile-butadiene-styrene copolymers, and the like.

Some polymeric substrates undergo a phenomenon referred to as "outgassing" or "out-gas releasing". For example, rigid layers such as poly(meth)acrylates, polycarbonates, and the like tend to outgas, particularly when they are relatively thick (e.g., in the range of about 1 millimeter to several centimeters). Outgassing substrates can adversely affect the stability, clarity, bond strength, or other desirable performance characteristics of an adhesive layer adjacent to these substrates. Applying an incompatible adhesive layer to an outgassing substrate may result in defects such as bubbles. Additionally, applying an incompatible adhesive layer to an outgassing substrate may also result in partial or full delamination of the adhesive bond between the outgassing substrate and another layer such as an optical film.

Outgassing can be particularly adverse when the other layer bonded to the outgassing substrate through the adhesive layer exhibits low moisture transmissivity. At least some optical films have a low moisture transmissivity. The low moisture transmissivity layer can act as a barrier to the release of the gas resulting in the accumulation of gas at the adhesive interface or within the adhesive layer. The accumulated gas can contribute to bubbling, delamination, reduced bond strength, loss of clarity, or a combination thereof. The diffusive pressure sensitive adhesives of this disclosure can often be used in applications with outgassing substrates.

In other embodiments, the substrate is a release liner. Any suitable release liner can be used. Exemplary release liners include those prepared from paper (e.g., Kraft paper) or polymeric material (e.g., polyolefins such as polyethylene or polypropylene, ethylene vinyl acetate, polyurethanes, polyesters such as polyethylene terephthalate, and the like). At least some release liners are coated with a layer of a release agent such as a silicone-containing material or a fluorocarbon-containing material. Exemplary release liners include, but are not limited to, liners commercially available from CP Film (Martinsville, Va.) under the trade designation "T-30" and "T-10" that have a silicone release coating on polyethylene terephthalate film. The liner can have a microstructure on its surface that is imparted to the adhesive to form a microstructure on the surface of the adhesive layer. The liner can then be removed to expose an adhesive layer having a microstructured surface.

The release liner can be removed to adhere the optical film to another substrate (i.e., removal of the release liner exposes a surface of an adhesive layer that subsequently can be bonded to another substrate surface). Often, the adhesive layer is permanently bonded to this other substrate.

The thickness of the adhesive layer in the articles of invention tends to be at least about 1 micrometer, at least 5 micrometers, at least 10 micrometers, at least 15 micrometers, or at least 20 micrometers. The thickness is often no greater than about 200 micrometers, no greater than about 175 micrometers, no greater than about 150 micrometers, or no greater than about 125 micrometers. For example, the thickness can be 1 to 200 micrometers, 5 to 100 micrometers, 10 to 50 micrometers, 20 to 50 micrometers, or 1 to 15 micrometers.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Table of Abbreviations

| Abbreviation or Trade Designation | Description |
|---|---|
| PSA-1 | A solution polymerized pressure sensitive adhesive containing 90 parts IOA and 10 parts AA, 28% solids in ethyl acetate, prepared as described in US Patent Number RE 24,906 (Ulrich). |
| BC-1 | Block Copolymer-1, PS-DMAEMA block copolymer with 99 parts styrene: 1 part DMAEMA, Mn = 37,400, Mw = 78,000, prepared via sequential living anionic polymerization according to the methods outlined in U.S. Pat. No. 6,969,491. |
| BC-2 | Block Copolymer-2, PS-DMAEMA block copolymer with 94 parts styrene: 6 parts DMAEMA, Mn = 15,000, Mw = 67,700, prepared via sequential living anionic polymerization according to the methods outlined in U.S. Pat. No. 6,969,491. |
| BC-3 | Block Copolymer-3, PS-PVP block copolymer with 99 parts styrene: 1 part vinylpyridine, Mn = 20,000, prepared via sequential living anionic polymerization according to the methods outlined in U.S. Pat. No. 6,969,491. |
| Bisamide | Aziridine crosslinker, 1,1'-(1,3-phenylene dicarbonyl)-bis-(2-methylaziridine) (CAS No. 7652-64-4). |
| IOA | Iso-octyl acrylate |
| AA | Acrylic acid |
| Release Liner | Release liner commercially available from CP Film (Martinsville, Va.) under the trade name "T-10". |
| PS | Polystyrene |
| PVP | Polyvinylpyridine |
| DMAEMA | N,N-2-dimethylamino ethyl methacrylate |
| PET Film | a primed polyester film of polyethylene terephthalate, 38 micrometers thick |

Test Methods
180° Peel Adhesion

This peel adhesion test is similar to the test method described in ASTM D 3330-90, substituting a glass substrate for the stainless steel substrate described in the test (for the present purpose, also referred to as "glass substrate peel adhesion test").

Adhesive coatings on polyester film were cut into 1.27 centimeter by 15 centimeter strips. Each strip was then adhered to a 10 centimeter by 20 centimeter clean, solvent washed glass coupon using a 2-kilogram roller passed once over the strip. The bonded assembly dwelled at room temperature for about one minute and was tested for 180° peel adhesion using an IMASS slip/peel tester (Model 3M90, commercially available from Instrumentors Inc., Strongsville, Ohio) at a rate of 2.3 meters/minute (90 inches/minute) over a five second data collection time. Two samples were tested; the reported peel adhesion value is an average of the peel adhesion value from each of the two samples.

Optical Properties

The transmission, haze and clarity of adhesive samples were tested by preparing laminates of the adhesive on a 7.6 centimeter×5 centimeter, 1 millimeter thick glass plate and covering with a 25.4 micrometer thick polypropylene film and measuring the properties using a HB 4725 Haze-Gard Plus commercially available from BYK-Gardner USA, Columbia, Md.

Domain Size Measurement

The domain size for the phase separated microdomains were measured by light scattering using a Horiba LA-910 particle size analyzer. Samples were tested by placing laminates of the test adhesive on a 7.6 centimeter×5 centimeter, 1 millimeter thick glass plate and covered with a 25.4 micrometer thick polypropylene film in the sample cell and a 1 millimeter glass plate with adhesive not containing block copolymer in the blank cell.

Environmental Resistance Test

Environmental resistance for a test adhesive was measured by preparing a laminate to an outgassing substrate (polycarbonate). A sample of the diffuse adhesive to be tested of 25.4 micrometers (1 mil) thickness was laminated to a polycarbonate sheet of 3.18 millimeter (0.125 inch) thickness and a PET Film of 51 micrometers (2 mil) was laminated on top. The laminate was heat treated between metal plates for 1 hour at 100° C. The samples were placed in an for 1 week at 95° C. and 95% Relative Humidity. The sample was then inspected visually and listed as "passed" if no bubbles or delamination was visible or "failed" if bubbles or delamination was visible.

Examples 1-11 and Comparative Example C1

For each of Examples 1-11 a stock solution of PSA-1 in ethyl acetate was diluted with a 50:30 mixture of ethyl acetate: methanol to yield a 15% solids solution. To this solution was added a solution of the Block Copolymer-1, -2, or -3 in ethyl acetate (15% solids) as shown in Table 1 and 0.1-0.2 weight % Bisamide crosslinker. For Comparative Example C1, only the Bisamide Crosslinker was added. The resulting solution was coated on a gap coater onto Release Liner to a wet thickness of 10 mils (254 micrometers) to give a dry thickness of 1 mil (25.4 micrometers). The coatings were dried in a 70° C. forced air oven for 10 minutes and were covered with a second Release Liner. Samples were tested for optical properties using the Test Methods described above. The results are shown in Table 2.

TABLE 1

| Example | Block Copolymer Identity | Block Copolymer (wt %) |
|---|---|---|
| 1 | BC-1 | 1 |
| 2 | BC-1 | 2 |
| 3 | BC-1 | 10 |
| 4 | BC-2 | 1 |
| 5 | BC-2 | 2 |
| 6 | BC-2 | 6 |
| 7 | BC-2 | 10 |
| 8 | BC-3 | 1 |
| 9 | BC-3 | 2 |
| 10 | BC-3 | 6 |
| 11 | BC-3 | 10 |

TABLE 2

| Example | % Transmission | % Haze | % Clarity | Average Domain Size (micrometers) |
|---|---|---|---|---|
| C1 | 96.6 | 0.93 | 99.2 | — |
| 1 | 93.8 | 30.4 | 99 | 1.84 |
| 2 | 93.6 | 37.5 | 98.7 | 1.23 |
| 3 | 91.9 | 97.8 | 79.1 | 1.90 |
| 4 | 93.7 | 24.7 | 99 | 1.08 |
| 5 | 93.7 | 24.7 | 99 | 1.48 |
| 6 | 92.4 | 63.2 | 98 | 1.41 |
| 7 | 92.7 | 73 | 96.8 | 1.12 |
| 8 | 94 | 22.9 | 99.1 | 1.07 |
| 9 | 93.6 | 35.9 | 98.5 | 1.34 |
| 10 | 92.8 | 72.5 | 86.9 | 2.71 |
| 11 | 92.7 | 91.7 | 54.1 | 2.63 |

Examples 12-29 and Comparative Example C2

For Examples 12-29, samples of differing thickness, crosslinker levels and weight percentages of the BC-1 were prepared as shown in Table 3 using the procedure described for Examples 1-11 above. In addition to the optical properties tests, the samples were also tested for 180° Peel using the test methods listed above. The results are shown in Table 4.

TABLE 3

| Example | Thickness (micrometers) | Weight % BC-1 | Weight % Bisamide |
|---|---|---|---|
| 12 | 254 (10 mil) | 2 | 0.13 |
| 13 | 254 (10 mil) | 5 | 0.11 |
| 14 | 254 (10 mil) | 5 | 0.14 |
| 15 | 254 (10 mil) | 11 | 0.10 |
| 16 | 254 (10 mil) | 11 | 0.13 |
| 17 | 254 (10 mil) | 11 | 0.15 |
| 18 | 254 (10 mil) | 17 | 0.11 |
| 19 | 254 (10 mil) | 17 | 0.14 |
| 20 | 254 (10 mil) | 20 | 0.13 |
| 21 | 381 (15 mil) | 2 | 0.13 |
| 22 | 381 (15 mil) | 5 | 0.11 |
| 23 | 381 (15 mil) | 5 | 0.14 |
| 24 | 381 (15 mil) | 11 | 0.10 |
| 25 | 381 (15 mil) | 11 | 0.13 |
| 26 | 381 (15 mil) | 11 | 0.15 |
| 27 | 381 (15 mil) | 17 | 0.11 |
| 28 | 381 (15 mil) | 17 | 0.14 |
| 29 | 381 (15 mil) | 20 | 0.13 |

TABLE 4

| Example | % Transmission | % Haze | % Clarity | 180° Peel Adhesion (N/dm) |
|---|---|---|---|---|
| 12 | 92.9 | 39.5 | 97.4 | 53.5 |
| 13 | 87.0 | 73.6 | 90.7 | 21.4 |
| 14 | 92.2 | 63.5 | 96.6 | 26.0 |
| 15 | 90.0 | 85.4 | 95.9 | 25.1 |
| 16 | 91.7 | 87.3 | 88.6 | 10.1 |
| 17 | 91.5 | 85.8 | 92.6 | 13.8 |
| 18 | 89.6 | 95.4 | 89.0 | 10.9 |
| 19 | 91.0 | 93.5 | 81.9 | 8.1 |
| 20 | 90.1 | 99.5 | 20.8 | 11.0 |
| 21 | 92.4 | 55.8 | 96.3 | 49.4 |
| 22 | 91.8 | 79.0 | 93.5 | 68.0 |
| 23 | 91.8 | 82.0 | 73.4 | 56.9 |
| 24 | 90.3 | 98.3 | 68.0 | 51.4 |
| 25 | 91.0 | 96.5 | 55.5 | 19.4 |
| 26 | 91.4 | 96.1 | 52.3 | 31.4 |
| 27 | 88.1 | 98.4 | 48.5 | 15.6 |
| 28 | 91.1 | 97.2 | 18.7 | 20.9 |
| 29 | 87.6 | 100 | 10.8 | 18.3 |

Examples 30-31

Samples for Environmental Resistance Testing were prepared as described in the test method above using adhesive samples prepared containing PSA-1, BC-1 and Bisamide. For Example 30 the adhesive contained 98 weight % PSA-1, 2 weight % BC-1 and 0.1 weight % Bisamide crosslinker. For Example 31 the adhesive contained 85 weight % PSA-1, 15 weight % BC-1 and 0.1 weight % Bisamide crosslinker. The results of the Environmental Resistance Test as well as the optical properties test results for the polycarbonate/adhesive/PET Film laminate are shown in Table 5.

TABLE 5

| Example | Environmental Resistance | % Transmission | % Haze | % Clarity |
|---|---|---|---|---|
| 30 | Passed | 84.5 | 43.0 | 92.9 |
| 31 | Passed | 77.0 | 90.3 | 85.4 |

What is claimed is:
1. An optically transmissive adhesive comprising:
an optically clear pressure sensitive adhesive matrix; and
a block copolymer dispersed within the optically clear pressure sensitive adhesive adhesive matrix, wherein the adhesive comprises phase-separated microdomains that are larger than 700 nanometers, and wherein the phase-separated microdomains comprise blocks of the block copolymerm, and wherein the optically transmissive adhesive is free of added diffusive particles, and wherein the optically trasmissive adhesive when bonded to a substrate and aged for 1 week at 95° C. and 95% relative humidity does not exhibit delamination of bubbles in the bond line.

2. The adhesive of claim 1 in which the block copolymer is a diblock copolymer wherein at least one block has a Tg of greater than 40° C.

3. The adhesive of claim 1 wherein the pressure sensitive adhesive matrix and the block copolymer form an acid-base interaction.

4. The adhesive of claim 2 wherein the block copolymer comprises a basic functional block.

5. The adhesive of claim 2 wherein the diblock copolymer comprises a styrene-acrylate copolymer.

6. The adhesive of claim 1 wherein the phase-separated microdomains are 1.0 to 10.0 micrometers.

7. The adhesive of claim 1 wherein the adhesive matrix comprises an acid functional copolymer.

8. The adhesive of claim 7 wherein the adhesive matrix comprises a (meth)acrylate copolymer.

9. The adhesive of claim 1 wherein the adhesive has a haze value of greater than 20% and an optical transmission (% T) of greater than 90%.

10. The adhesive of claim 1 further comprising a crosslinking agent.

11. The adhesive of claim 1 wherein the adhesive further comprises a microstructured surface.

* * * * *